Sept. 28, 1948.  P. F. M. GLOESS  2,449,985

RECEIVER FOR PULSE WAVES

Filed Oct. 30, 1941

INVENTOR.
PAUL F. M. GLOESS

BY

*R P Morris*

ATTORNEY

UNITED STATES PATENT OFFICE 2,449,985

RECEIVER FOR PULSE WAVES

Paul F. M. Gloess, Paris, France, assignor to International Standard Electric Corporation, New York, N. Y., a corporation of Delaware Application October 30, 1941, Serial No. 417,181
In France April 27, 1940

Section 1, Public Law 690, August 8, 1946
Patent expires April 27, 1960

3 Claims. (Cl. 250—20)

The present invention relates to means that can be used particularly for the amplification of impulses.

In numerous instances use is made of periodic impulses of very short duration, such as impulses used in systems for detecting obstacles, motions, etc., and for measuring distances.

In such systems where the mensuration is by observing the position of a peak indication of a cathode ray oscillograph, the intensity of the reflected waves may, for example, vary from one instant to another following, e. g. the displacements of the movable object.

As a result of this, the peaks observed in the oscillograph have an amplitude which may vary from one instant to another and this may disturb the comfortable observation of events and mensurations.

According to the characteristic features of the present invention, the sensitivity of the receiver is made dependent upon the amplitude of the peaks reflected by the selected moving object and the reflections of other moving objects or other parasitic signals arriving at other instants are excluded.

One may use the measuring arrangement forming the object of the application for U. S. Letters Patent S. N. 381,640 filed February 25, 1941 entitled "Position finding system for gun fire control" in which measuring is accomplished by causing the coincidence in an oscillograph, a reference impulse having the same cadence as the reflected impulses, but retarded for this purpose by a system of artificial lines. If this is done, then the reference peak is used for controlling of the gain control system. This arrangement will follow, therefore, solely the amplitude of the selected impulses received, and in accordance with the well-known arrangement of such apparatus, it will tend to maintain the amplitude of the peaks applied to the oscillograph constant within narrow limits. One can use a wider peak than the reference peak (i. e. that appearing on the oscillograph for measuring purposes), thus insuring easier and more certain operation of the unblocking circuits.

This circuit for controlling the sensitivity may be used in connection with the circuit described in the U. S. Patent Application S. N. 382,390 filed March 8, 1941, now abandoned and entitled "Improvement in impulse translating systems," the object of which is to increase the sensitivity of the receiver to a very high value during a short period of time corresponding to the arrival of reflected impulses.

In this manner by momentarily overcharging one or several elements, e. g. tubes of the receiver, a sensitivity, and an amplification can be obtained which would be impossible in normal operation.

The invention will be described with reference to an embodiment shown in the attached drawings in which.

Figure 1:
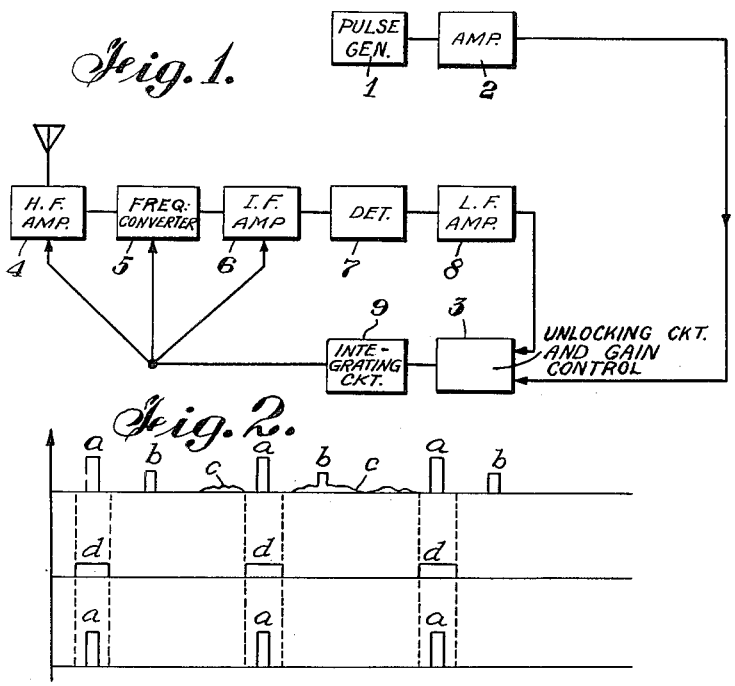
Fig. 1 illustrates the application of the invention for measuring from a distance by means of electromagnetic waves.

In Fig. 1, the arrangement shown is applied for the sake of an example, to an arrangement for measuring distance by radio impulses as described in the above mentioned application S. N. 381,640. According to this system impulses are transmitted and are received at the transmitting point after reflection from an object. The received reflected impulses are compared on an oscillograph screen with a standard reference impulse of the same cadence as the transmitted impulse. By adjusting the delay of the reference impulse the distance of the reflecting object is determined.

As above stated, measuring is accomplished by causing the coincidence on the screen of a cathode ray oscillograph of a reflected peak with a reference peak of the same cadence but retarded in an adjustable system of retardation lines by a length of time equal to the return trajectory of the reflected impulse. For simplification of the illustration only so much of the receiving circuit as is necessary for an understanding of the present invention is included in the description and drawings.

The arrangement for generating and for controlling the retardation of the reference impulses are indicated at 1 in the block diagram, Fig. 1. An arrangement permitting the broadening of the impulses in order to facilitate the operation of the amplification control is indicated at 2. These devices may be of any well-known type, for example, they may be made in accordance with the U. S. Application S. N. 380,186 filed Feb. 21, 1941, entitled "Radio-electric impulse system," now Patent No. 2,423,082 which issued July 1, 1947. The controlling signals thus broadened which frame the reflected peaks are applied to the unblocking circuit of the gain control sysn 3. The function of this circuit is to permit e automatic gain control system to operate in cordance solely with the reflected impulses lich coincide with the reference peak. The circuit receives also the signals which come from e receiving system comprising, e. g. a high-frequency amplifier 4, a frequency converter 5, intermediate frequency amplifier 6, followed a detector 7, and a low-frequency amplifier 8. These signals cannot affect the modification of e gain except during the instance when the blocking system 3 is actuated by the impulses rived from circuit 2. The signals leaving the blocking circuit 3 are utilized for gain control er they pass into an integrating circuit 9, the ne constant of which is suitably selected with spect to the duration and cadence of the impulses so as to act upon the potentials controlling e sensitiveness and applied to the different elements of the receiver, such as the high frequency ges 4, the frequency converter 5 and the intermediate frequency amplifier 6.

Figure 2:
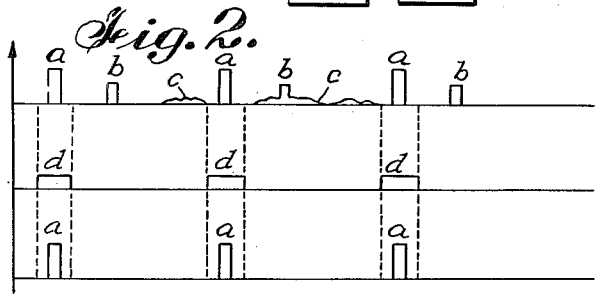
Fig. 2 represents forms of the signals.

Fig. 2 illustrates in its upper portion the output nals of the receiver. The rectangles $a$ represent the impulses corresponding to the movable ject selected, $b$, the impulses corresponding to other movable object, and $c$, the irregularly tributed parasitics. In the center of the Figure are shown the slightly broadened impulses, $d$ rived from the reference peaks which are used : measuring the distance of the obstacle from lich the reflected impulses $a$ are received. It ll be seen, therefore, that the automatic sensitivity control can function only during the impulses $d$ and, therefore, only the reflected impulses $a$ coming from the selected movable object will influence the receiver and all other nals, whether periodic or not, will be without ect. The output of the unblocking system 3 ll, therefore, contain only the impulses $a$ as own in the lower part of the figure. These are e impulses which, after integration, affect the tomatic sensitivity control.

It will be seen, therefore, that the arrangement ovided in accordance with the present invention should preferably be combined with the arrangement for rendering the receiver super-sitive described in the above mentioned application S.N. 382,390.

Figure 3:
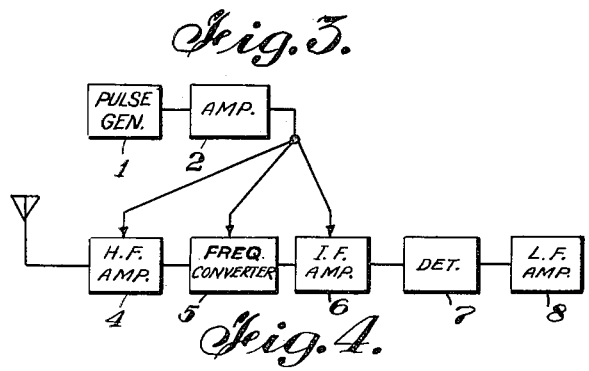
Fig. 3 represents an example of the circuit for rendering the device oversensitive.

Fig. 3 illustrates an embodiment of the invention of application S.N. 382,390 in a block diagram similar to Fig. 1.

The elements of this figure which correspond to ose of Fig. 1 are designated by the same reference numerals. The broadened reference peaks, above stated, are utilized for directly modifying e characteristics of the receiver during a corresponding period so as to increase its sensitiveness a value which may be materially increased, and is is accomplished by acting on the circuits 4, and 6 of the receiver.

Figure 4:
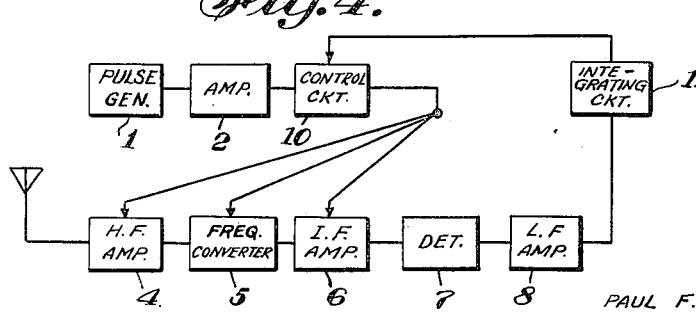
Fig. 4 represents the combination of said arrangement for rendering oversensitive with elements of the invention.

Fig. 4 represents the application of the present vention to Fig. 3. Instead of employing the direct automatic sensitivity control described in connection with Fig. 1, the automatic control of the sensitivity of the receiver is effected by acting upon the amplitude of the impulses which control the super-sensitizing. These super-sensitizing impulses originate, as stated in connection with Fig. 3, in the circuit 2. The impulses are applied to the circuit 10 which controls the super-sensitizing, and at the same time, the impulses originating in the low-frequency portion of the receiver are applied to circuit 10 after passage through an integrating circuit 11, the constant of which depends on the intervals between the impulses and their duration.

A circuit will thus be obtained in which oscillations caused by variations in the reflection of electromagnetic waves by the obstacle are eliminated and, at the same time, the sensitiveness of the receiver can be considerably increased. This will be particularly important when very short waves are used which the present arrangement will amplify to a greater extent than would be possible with usual means.

Although the present invention has been described as applied to a particular embodiment, it will be clear that it is not limited to this application and that it may be used in combination with other arrangements.

What is claimed is:

1. A radio receiving system for receiving regularly spaced impulses after reflection from a distant object and comparing said received impulses with a reference impulse having the same cadence as said regularly spaced impulses, comprising means for broadening said reference impulses, combining means for combining said broadened impulses and received impulses to produce resultant control impulses, and means for applying said resultant control impulses to said receiver to render it sensitive to receive signals during the desired intervals, whereby undesired reflected signals and interference is substantially reduced.

2. A radio receiving system according to claim 1 further comprising means for integrating said combined broadened and received impulses to provide said resultant impulses.

3. A radio receiver according to claim 1 further comprising means for integrating said received impulses prior to applying them to said combining means.

PAUL F. M. GLOESS.

REFERENCES CITED

The following references are of record in the file of this patent:

UNITED STATES PATENTS

| Number | Name | Date |
| --- | --- | --- |
| 2,055,883 | Terry | Sept. 29, 1936 |
| 2,143,035 | Smith | Jan. 10, 1939 |
| 2,189,549 | Hershberger | Feb. 6, 1940 |
| 2,225,524 | Percival | Dec. 17, 1940 |